United States Patent
Hamilton et al.

(10) Patent No.: US 11,441,991 B2
(45) Date of Patent: Sep. 13, 2022

(54) MULTI-ANGLE DYNAMIC LIGHT SCATTERING

(71) Applicant: Malvern Panalytical Limited, Malvern (GB)

(72) Inventors: Douglas Hamilton, Malvern (GB); Jason Corbett, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 0 days.

(21) Appl. No.: 16/965,204

(22) PCT Filed: Feb. 6, 2019

(86) PCT No.: PCT/EP2019/052946
§ 371 (c)(1),
(2) Date: Jul. 27, 2020

(87) PCT Pub. No.: WO2019/154882
PCT Pub. Date: Aug. 15, 2019

(65) Prior Publication Data
US 2021/0063295 A1 Mar. 4, 2021

(30) Foreign Application Priority Data

Feb. 6, 2018 (EP) .................... 18155428

(51) Int. Cl.
*G01N 15/02* (2006.01)
*G01N 21/47* (2006.01)

(52) U.S. Cl.
CPC .......... *G01N 15/0211* (2013.01); *G01N 2015/025* (2013.01); *G01N 2015/0222* (2013.01); *G01N 2021/4711* (2013.01)

(58) Field of Classification Search
CPC .......... G01N 15/0211; G01N 15/1459; G01N 15/0205; G01N 2015/1493;
(Continued)

(56) References Cited

U.S. PATENT DOCUMENTS

2003/0030802 A1* 2/2003 Watson .............. G01N 15/0211
356/336
2007/0242269 A1 10/2007 Trainer
(Continued)

FOREIGN PATENT DOCUMENTS

CN 105891063 A * 8/2016
EP 3229008 A1 10/2017
JP 2016211945 A * 12/2016

OTHER PUBLICATIONS

Bryant et al. (1995). "Improved Particle Size Distribution Measurements Using Multiangle Dynamic Light Scattering," Langmuir 11(7): 2480-2485.
(Continued)

*Primary Examiner* — Michael P Stafira
(74) *Attorney, Agent, or Firm* — Morrison & Foerster LLP

(57) ABSTRACT

A method of determining particle size distribution from multi-angle dynamic light scattering data, comprising: obtaining a series of measured correlation functions $g(\theta_i)$ at scattering angles $\theta_i$; and solving an equation comprising $$\begin{bmatrix} g(\theta_1) \\ \ldots \\ g(\theta_n) \end{bmatrix} = \begin{bmatrix} \alpha_1 K(\theta_1) \\ \ldots \\ \alpha_n K(\theta_n) \end{bmatrix} x,$$

wherein: $K(\theta_i)$ is the instrument scattering matrix computed for angle i, x is the particle size distribution, and $\alpha_i$ is the scaling coefficient for angle i. The method comprises using the steps: a) providing initial estimates for scaling factors $\alpha_2$ to $\alpha_n$, and defining $\alpha_1=1$; b) iterating scaling factors $\alpha_2$ to $\alpha_n$ using a non-linear solver; c) solving for x using a linear
(Continued)

solver; d) calculate residual; e) repeat steps b) to d) while the residual is greater than a predefined exit tolerance.

14 Claims, 5 Drawing Sheets

(58) Field of Classification Search
CPC .............. G01N 2015/0053; G01N 2015/0222; G01N 15/1434; G01N 2015/0046; G01N 2015/1486; G01N 2015/0084; G01N 21/49; G01N 2015/0693; G01N 2015/1087; G01N 21/51; G01N 15/0227; G01N 2015/0073; G01N 2015/008; G01N 2015/1497; G01N 2201/06113; G01N 2500/10; G01N 15/02; G01N 15/1436; G01N 15/06; G01N 15/1463; G01N 2015/0038; G01N 2015/0065; G01N 2015/025; G01N 2015/03; G01N 2015/1006; G01N 21/0303; G01N 21/53; G01N 33/56983; G01N 15/042; G01N 15/10; G01N 15/147; G01N 2015/0088; G01N 2015/0092; G01N 2015/1093; G01N 21/47; G01N 21/6428; G01N 2500/04; G01N 30/02; G01N 33/483; G01N 33/5008; G01N 33/502; G01N 33/5026; G01N 33/5044; G01N 33/569; G01N 33/56905; G01N 33/56911; G01N 33/56961; G01N 33/56966; G01N 33/574; G01N 15/05; G01N 15/1429; G01N 15/1468; G01N 2015/0238; G01N 2015/144; G01N 2021/4707; G01N 2021/4711; G01N 21/474; G01N 21/532; G01N 21/85; G01N 2201/068; G01N 2201/12; G01N 15/1031; G01N 15/1404; G01N 15/1456; G01N 1/2202; G01N 2001/2223; G01N 2015/0011; G01N 2015/0026; G01N 2015/003; G01N 2015/0277; G01N 2015/0294; G01N 2015/1075; G01N 2015/1454; G01N 2015/1472; G01N 2021/4153; G01N 2021/4709; G01N 2021/4726; G01N 2021/8835; G01N 21/15; G01N 21/274; G01N 21/31; G01N 2291/02408; G01N 2291/02416; G01N 2291/028; G01N 2291/0289; G01N 2333/185; G01N 27/72; G01N 29/032; G01N 29/12; G01N 29/4418; G01N 29/4472; G01N 33/49; G01N 33/54346; G01N 33/553; G01N 33/86; G01N 5/02; G01N 9/00

See application file for complete search history.

(56) References Cited

U.S. PATENT DOCUMENTS

| | | | |
|---|---|---|---|
| 2012/0008143 A1* | 1/2012 | Ihlefeld | G01N 15/0205 356/335 |
| 2017/0074768 A1* | 3/2017 | Moitzi | G01N 15/1463 |
| 2017/0322133 A1 | 11/2017 | Trainer | |

OTHER PUBLICATIONS

Bryant et al. (1996). "Improved Particle Size Distribution Measurements Using Multiangle Dynamic Scattering. 2. Refinements and Applications," Langmuir 12 (26): 6224-6228.

Cummins et al. (1987). "Particle Size Distributions Determined by a "Multiangle" Analysis of Photon Correlation Spectroscopy Data," Langmuir 3: 1109-1113.

European Search Report dated Sep. 6, 2018, directed to EP 18155428; 5 pages.

Extended European Search Report dated Sep. 17, 2018, directed to EP 18155428; 7 pages.

Hansen et al. (Nov. 1993). "The Use of The L-Curve in the Regularization of Discrete III-Posed Problems," SIAM Journal on Scientific Computing 14(6): 1487-1503.

International Search Report and Written Opinion dated May 3, 2019, directed to International Application No. PCT/EP2019/052946; 18 pages.

Lei et al. (2016). "A Recursive Regularization Algorithm for Estimating the Particle Size Distribution from Multiangle Dynamic Light Scattering Measurements," Journal of Quantitative Spectroscopy and Radiative Transfer 178: 244-254.

Liu et al. (2012). "Multiangle Dynamic Light Scattering Analysis Using Angular Intensity Weighting Determined by Iterative Recursion," Applied Optics 51(7): 846-854.

Vega et al. (2003). "Latex Particle Size Distribution by Dynamic Light Scattering: Novel Data Processing for Multiangle Measurements," Journal of Colloid and Interface Science 261: 74-81.

* cited by examiner

MULTI-ANGLE DYNAMIC LIGHT SCATTERING

CROSS-REFERENCE TO RELATED APPLICATIONS

This application is a national stage application under 35 USC 371 of International Application No. PCT/EP2019/052946, filed Feb. 6, 2019, which claims the priority of European Application No. 18155428.8, filed Feb. 6, 2018, the entire contents of each of which are incorporated herein by reference.

FIELD OF THE DISCLOSURE

The present invention relates to a method for determining particle size from a multi-angle dynamic light scattering measurement.

BACKGROUND OF THE DISCLOSURE

Dynamic light scattering is a widely used method for analysing particles in which a time series of measurements of scattered light is used to determine a size or size distribution of particles. Particle characteristics are inferred from the temporal variation in the scattered light. Typically, an autocorrelation is performed on the time series of scattered light intensity, and a fit (e.g. Cumulants, CONTIN, NNLS/non-negative least squares) is performed to the autocorrelation function to determine particle characteristics. Alternatively, a fourier transform may be used to determine a power spectrum of the scattered light, and an analogous fit to the power spectrum performed to determine particle characteristics. Typically, light scattered in a single, well-defined, angle is used in a dynamic light scattering measurement.

Multi-angle dynamic light scattering (MADLS) measurements may also be performed, in which light scattered at more than one angle is used in a dynamic light scattering measurement (Bryant, Gary, and John C. Thomas. "Improved particle size distribution measurements using multiangle dynamic light scattering." Langmuir 11.7 (1995): 2480-2485).

When multiple scattering angles are used, it is necessary to determine particle characteristics that are most consistent with the scattering data obtained at each scattering angle. There is considerable room for improvement in the existing techniques for doing this.

SUMMARY OF THE DISCLOSURE

According to a first aspect, there is provided a method of determining particle size distribution from multi-angle dynamic light scattering data, comprising solving an equation of the form:

$$\begin{bmatrix} g(\theta_1) \\ \dots \\ g(\theta_n) \end{bmatrix} = \begin{bmatrix} \alpha_1 K(\theta_1) \\ \dots \\ \alpha_n K(\theta_n) \end{bmatrix} x$$

wherein $g(\theta_i)$ is the measured correlation function at angle i, $K(\theta_i)$ is the instrument scattering matrix computed for angle i, x is the particle size distribution, and $\alpha_i$ is the scaling coefficient for angle i.

The method comprising using the steps:
a) providing initial estimates for scaling factors $\alpha_2$ to $\alpha_n$, and defining $\alpha_1=1$;
b) iterating scaling factors $\alpha_2$ to $\alpha_n$ using a non-linear solver;
c) solving for x using a linear solver;
d) calculate residual
e) repeat steps b) to d) while the residual is greater than a predefined exit tolerance.

The linear solver may be NNLS, and/or the non-linear solver may be selected from Nelder-Mead simplex, Levenberg-Marquardt and Gauss-Newton.

The initial estimates for the scaling factors $\alpha_i$ (e.g. $\alpha_2$ to $\alpha_n$) may be estimated by extrapolation of a correlation function g(θi) to a zero-delay time (τ=0).

In some embodiments $\alpha_1$ may not be defined as 1.

The predefined exit tolerance may be: a convergence criterion based on the preceding residual, or an absolute residual threshold.

The method may further comprise repeating the steps a) to e) for a different non-linear solver, to determine which non-linear solver provides the smallest residual.

The method may further comprise measuring a time history of scattered light intensity at each respective scattering angle, θ, and determining the correlation functions $g(\theta_i)$ for each scattering angle.

According to a second aspect, there is provided a method of determining particle size distribution from dynamic light scattering data, comprising:
obtaining a measured correlation functions $g(\theta_1)$ to $g(\theta_n)$; and
solving an equation of the form:

$$\begin{bmatrix} g(\theta_1) \\ \dots \\ g(\theta_n) \end{bmatrix} = \begin{bmatrix} \alpha_1 K(\theta_1) \\ \dots \\ \alpha_n K(\theta_n) \end{bmatrix} x$$

wherein:
$g(\theta_i)$ is the measured correlation function for measurement time i, corresponding with a scattering angle $\theta_i$, $K(\theta_i)$ is the instrument scattering matrix computed for the angle $\theta_i$, x is the particle size distribution and $\alpha_i$ is the scaling coefficient for measurement time i (with $\alpha_1=1$);
the vector x takes the form: $[x_1, \dots, x_N, n_1, \dots, n_n]$, where $x_1$ to $x_N$ are the scattering intensities corresponding with each particle size bin, and the terms $n_1$ to $n_n$ are noise intensities corresponding with each of the measurement times or angles; and
columns in K are computed as the expected instrument response according to each element in x, with columns in K at indexes according to elements $x_1$ to $x_N$ calculated for each correlator lag-time, τ and angle, θ, and columns at indexes $n_1$ to $n_n$ calculated as a computed noise contribution at each angle, θ, based on an assumption about the characteristics of the noise.

The dynamic light scattering data may be multi-angle data, and each measurement time corresponds with a different measurement angle $\theta_i$; or the dynamic light scattering data may be single angle data, and each measurement time i corresponds with the same measurement angle $\theta_i$. In other embodiments, a combination of same angle and different angle data may be used in the analysis.

The particle size distribution may be determined according to the first aspect, including any of the optional features thereof.

The computed noise contribution may be based on the expected instrument response to a large particle in a scattering volume of the instrument. The large particle may be assumed to be at least 3 microns in diameter, or at least 10 microns in diameter.

The computed noise contribution may be determined according to:

$$g_1(\tau) = \exp(-q_i^2 D_t \tau)$$

where:

$g_1(\tau)$ is the instrument-measured field autocorrelation functions at lag time, $\tau$; q is the scattering wave vector $$\left(q = \frac{4\pi n_0}{\lambda}\sin\left(\frac{\theta_i}{2}\right)\right);$$

$n_0$ is the dispersant refractive index; $\lambda$ is the vacuum wavelength; $\theta_i$ is the scattering angle; $D_t$ is the translational diffusion coefficient $$\left(D_t = \frac{k_B T}{3\pi \eta d}\right);$$

$k_B$ is the Boltzmann constant; T is the absolute temperature; $\eta$ is the dispersant viscosity; and d is the assumed large particle hydrodynamic diameter.

The method may further comprise sequentially measuring a time history of scattered light intensity at each respective time and/or scattering angle, $\theta$, and determining the correlation functions $g(\theta_n)$ for each time and/or scattering angle.

According to a third aspect, there is provided a method of determining a particle size distribution, x, from a dynamic light scattering measurement, comprising:

obtaining a correlation function, g, derived from a time sequence of scattering intensity;

solving a system of linear equations comprising:

$$\begin{bmatrix} g \\ 0 \end{bmatrix} = \begin{bmatrix} K \\ \gamma\Gamma \end{bmatrix} x$$

by minimising the sum of residuals:

$$\|Kx-g\|^2 + \|\gamma\Gamma x\|^2$$

where K is an instrument scattering matrix, $\Gamma$ is a regularisation matrix, and $\gamma$ is a regularisation vector comprising regularisation coefficients for each particle size in the particle size distribution, x.

The method may further comprise performing a measurement to obtain the time sequence of scattering intensity.

The system of linear equations to be solved may include regularisation, thereby comprising:

$$\begin{bmatrix} g(\theta_1) \\ \ldots \\ g(\theta_n) \\ 0 \end{bmatrix} = \begin{bmatrix} \alpha_1 K(\theta_1) \\ \ldots \\ \alpha_n K(\theta_n) \\ \gamma\Gamma \end{bmatrix} x$$

wherein the system of equations is solved using steps a) to e), as defined in the first aspect, and in combination with any of the optional features of the first aspect.

Optionally, in the third aspect:

the vector x takes the form: $[x_1, \ldots, x_N, n_1, \ldots, n_n]$, where $x_1$ to $x_N$ are the scattering intensities corresponding with each size bin, and the terms $n_1$ to $n_n$ are noise intensities corresponding with each of the measurement times or angles; and columns in K are computed as the expected instrument response according to each element in x, with columns in K at indexes according to elements $x_1$ to $x_N$ calculated for each correlator lag-time, $\tau$ and angle, $\theta$, and columns at indexes $n_1$ to $n_n$ calculated as a computed noise contribution, at each angle, $\theta$, based on an assumption about the characteristics of the noise.

According to a fourth aspect, there is provided a machine readable medium, comprising instructions for causing a processor to perform the method of any of the preceding aspects.

According to a fifth aspect, there is provided an instrument for performing a DLS measurement, comprising: a light source, a sample holder, a detector, and a processor; wherein:

the light source is configured to illuminate a sample in the sample holder with a light beam to produce scattered light from the interaction of the light beam with particles suspended in the sample holder by a fluid;

the detector is configured to detect the scattered light and to provide measurement data to the processor, the processor is configured to process the measurement data to determine a particle size distribution using a method according to any of the first, second or third aspects, including any optional features thereof.

Each of the features of each aspect (including optional features) may be combined with those of any other aspect.

BRIEF DESCRIPTION OF THE FIGURES

Embodiments of the invention will be described, purely by way of example, with reference to the accompanying drawings, in which.

DETAILED DESCRIPTION OF THE DISCLOSURE

Improved Solver Methods

Figure 1:
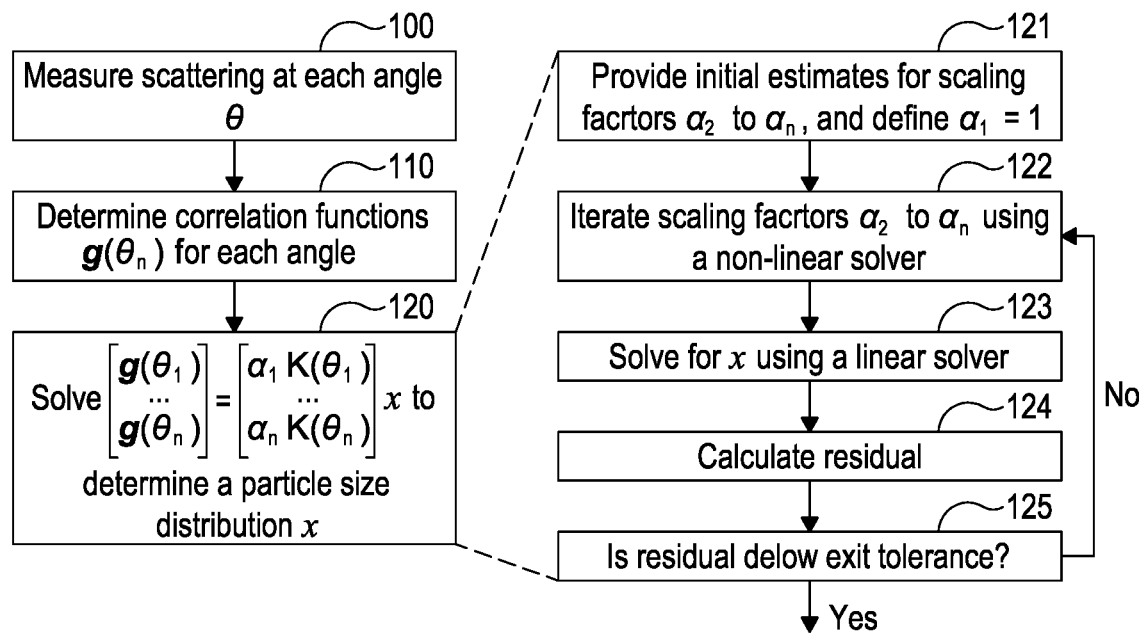
FIG. 1 is a flow diagram exemplifying a method according to an embodiment of the first aspect.

When performing a MADLS measurement with three measurement angles ($\theta_1$, $\theta_2$ and $\theta_3$) the following system of linear equations must be solved (with only the relevant matrix components shown):

$$\begin{bmatrix} g(\theta_1) \\ g(\theta_2) \\ g(\theta_3) \end{bmatrix} = \begin{bmatrix} K(\theta_1) \\ aK(\theta_2) \\ bK(\theta_1) \end{bmatrix} x \quad (1)$$

Where $g(\theta_i)$ is the measured correlation function at angle i, $K(\theta_i)$ is the instrument scattering matrix computed for angle i, and x is the particle size distribution. The aim is to determine the particle size distribution from the measured correlation functions. The coefficients a and b are scaling factors, and initial estimates for these can be calculated by extrapolation (linear or otherwise) of the correlation function to time-zero to determine the y-axis multiplier. The physical origin of a and b is the sum of the scattered intensity into each angle.

Note that the first scattering angle $\theta_1$ has arbitrarily been chosen as the measurement angle to which the other measurement angles are scaled. It will be appreciated that any of the other measurement angles could alternatively be selected as having a unitary scaling factor, and the other measurement angles scaled to that angle.

Bryant (referenced above) discloses deriving a and b from the count rate, and the use of a linear solver, but this method is prone to error if the count rate is not stationary over time. Cummins (P. G. Cummins, E. J. Staples, *Particle Size Distributions Determined by a "Multiangle" Analysis of Photon Correlation Spectroscopy Data, Langmuir*, 1987, 3, 1109-1113) discloses using a non-linear solver to determine a, b and x. Applying a non-linear solver in this way is problematic, because there are a large number of coefficients (in x) to be determined and there is a significant possibility that the solution will not converge reliably.

In embodiments of the present invention, a nested approach is used, in which a non-linear solver (such as Nelder-Mead simplex, Levenberg-Marquardt, Gauss-Newton or another method) is used to iterate an estimate for a and b, and within each non-linear iteration, a linear solver (e.g. non-negative least squares) is used to determine a best fit for x and consequently determine a residual error. The residual error is then used by the non-linear solver to select new values for each of the scaling factors. This is exemplified in the following pseudo-code:

---

Provide initial estimates for a and b
Do {
    Iterate a and b using a non-linear solver, such as Nelder-Mead simplex, Levenberg-Marquart, Gauss-Newton or other method
        Solve for x using a linear solver, such as non-negative least squares
        Calculate residual, of the form $\|g - Kx\|^2$
} while (residual>predefined exit tolerance)

---

This nested technique allows a fast and robust linear method (e.g. NNLS) to be applied to the linear problem of solving the particle distribution. Coefficients a and b are variable scalars that require a non-linear approach, and a non-linear solver is therefore appropriate for this. This approach is preferable over tackling the entire problem with a non-linear solver (the approach taken by Cummins). Embodiments therefore provide more robust, faster to execute, solutions for MADLS. This in turn enables a larger number of size classes (i.e. a longer vector x), so that MADLS can be used to span a greater size range than in the literature, or to provide a particle size distribution with a greater resolution than in the prior art.

This method can be generalised to apply to the following set of equations, for n number of scattering angles:

$$\begin{bmatrix} g(\theta_1) \\ \ldots \\ g(\theta_n) \end{bmatrix} = \begin{bmatrix} \alpha_1 K(\theta_1) \\ \ldots \\ \alpha_n K(\theta_n) \end{bmatrix} x \quad (2)$$

With $\alpha_i$ corresponding with the scaling coefficient for angle i.

Conventionally, the first scattering (i=1) angle may have a scaling coefficient defined as 1 ($\alpha_1$=1). As mentioned above, this is merely an arbitrary convention: in alternative embodiments the scaling may be performed relative to any of the measurements 1 to n. It will also be appreciated that the order of concatenation of measurement results is also arbitrary, and any of the measurements may be placed first. For ease of notation, the scaling mentioned herein is denoted as relative to the first measurement, but this does not imply a limitation.

The generalised pseudo code therefore becomes:

---

Provide initial estimates for $\alpha_2$ to $\alpha_n$, and define $\alpha_1$ = 1
Do {
    Iterate $\alpha_2$ to $\alpha_n$ using a non-linear solver, such as Nelder-Mead simplex, Levenberg-Marquart, Gauss-Newton or other method
        Solve for x using a linear solver, such as non-negative least squares
        Calculate residual, of the form $\|g - Kx\|^2$
} while (residual>predefined exit tolerance)

---

In each iteration of the non-linear solver (e.g. Levenberg-Marquart, etc.), the estimate for each of the scaling coefficients $\alpha_2$ to $\alpha_n$ is updated before a new estimate for the particle size distribution x is determined using a linear solver such as NNLS, and the new estimate of particle size distribution is used to calculate a residual. The residual is both used by the non-linear solver in the next iteration to select the new estimates for the scaling factors, and to determine if the estimates are acceptable. This work flow means that the problem is efficiently partitioned so that the scaling factors can be accurately and efficiently determined.

FIG. 1 schematically illustrates a method of determining a particle size distribution according to an embodiment. At step 100, a time series of scattering intensity is measured (or determined from a time history of photon arrival times) at each scattering angle (e.g. sequentially, or in some embodiments, simultaneously). At step 110, correlation functions are determined for each scattering angle from the respective time series of scattering intensity (e.g. using a correlator). At step 120, the equation (2) is solved to determine a particle size distribution x.

The process of solving equation (2) to determine the particle size distribution comprises:

at step 121, determining initial estimates for scaling factors $\alpha_2$ to $\alpha_n$, and defining $\alpha_1=1$;

at step 122, iterating scaling factors $\alpha_2$ to $\alpha_n$ using a non-linear solver;

at step 123, solving for x using a linear solver;

at step 124, calculate residual at step 125, check whether the residual is greater than a predefined exit tolerance.

Noise

When performing a multi-angle DLS measurement, the data that is measured at each angle must be representative of the same sample. In most measurements, it can be assumed that the sample will not change over the duration of the measurement. If Typically, because of the relatively high cost of suitable detectors for DLS (which typically employs a photon counting detector such as an avalanche photodiode) the scattering measurements at each angle are taken sequentially, with an optical path to a single detector cycled between each detection angle. Additionally, due to the field of view of the detector, different measurement angles sample a subtly different scattering volume, even if the volume centres are coincident. Under these measurement circumstances, a transient contaminant (such as dust, or filter debris) will tend to contaminate a single scattering angle. This will adversely affect the result, since it will not be possible to find a common solution that satisfies the measurement data (because one of the measurements is not representative of the sample).

It is possible to accommodate the presence of noise at a single angle during the fitting process by including terms (specific to the noise type) in the solution that depend each only on a single angle. The particle size distribution result should remain common across all angles. Noise usually manifests as a slowly decaying contribution to the correlogram caused by dust at one measurement angle. However, noise types of any form can be accounted for if they are suspected to exist.

As already discussed above, the regular system of linear equations is of the form g=Kx, where g is the measured correlation function, K is the instrument scattering matrix, and x is the particle size distribution (neglecting the scaling factor coefficients for simplicity of notation).

With application to MADLS, the equation becomes (with only the relevant matrix components shown):

$$\begin{bmatrix} g(\theta_1) \\ ... \\ g(\theta_n) \end{bmatrix} = \begin{bmatrix} K(\theta_1) \\ ... \\ K(\theta_n) \end{bmatrix} x \qquad (3)$$

In prior art analyses, the vector x comprises a set of N scalar values, each scalar value defining an intensity of scattering from a particular range of particle sizes (or bin). In embodiments of the present invention, the vector x includes at least one additional value that is included to accommodate the presence of contaminants at one or more scattering angle. For n=3, corresponding with three measurement angles, and a particle size distribution comprising N size bins, the vector x may take the following form: [$x_1$, $x_2$, $x_3$, ..., $x_N$, $n_1$, $n_2$, $n_3$], where $x_1$ to $x_N$ are the scattering intensities corresponding with each size bin, and the terms $n_1$ to $n_3$ are noise intensities corresponding with each of the three scattering angles.

The matrix $$\begin{bmatrix} K(\theta_1) \\ ... \\ K(\theta_n) \end{bmatrix}$$

has the following form: columns in K are computed as the expected instrument response according to each element in x. Columns at indexes according to elements $x_1$ to $x_N$ may be calculated theoretically for each correlator lag-time, $\tau$, and angle, $\theta$. Columns at indexes $n_1$ to $n_3$ take the form of a computed noise contribution, at each angle, based on an assumption about the characteristics of the noise.

In an example embodiment, the noise contribution is assumed to take the form of large transient particles in the scattering volume. For example, the model used to estimate the noise contribution columns of K may mimic that used to compute the expected instrument response for a size bin, but use a fixed particle diameter of 10 microns at the particular scattering angle i, and for each correlator lag-time, $\tau$:

$$g_i(\tau)=\exp(-q_i^2 D_t \tau) \qquad (4)$$

Where:

$g_1(\tau)$ is the instrument-measured field autocorrelation functions at lag time, $\tau$;

q is the scattering wave vector $$\left(q = \frac{4\pi n_0}{\lambda}\sin\left(\frac{\theta_i}{2}\right)\right);$$

$n_0$ is the dispersant refractive index;

$\lambda$ is the vacuum wavelength;

$\theta_i$ is the scattering angle;

$D_t$ is the translational diffusion coefficient $$\left(D_t = \frac{k_B T}{3\pi\eta d}\right);$$

$k_B$ is the Boltzmann constant;

T is the absolute temperature;

$\eta$ is the dispersant viscosity; and d is the particle hydrodynamic diameter.

Since the noise at each angle is not related to the noise at any other measurement angle (for a sequential multi-angle measurement), elements are zero at angles other than for which the noise is considered. If large material is present at just one angle, the solution residual will minimise if intensity is assigned to the noise bin during fitting. The solver will not compromise the particle size distribution fit result by addition of spurious particles.

Figure 2:
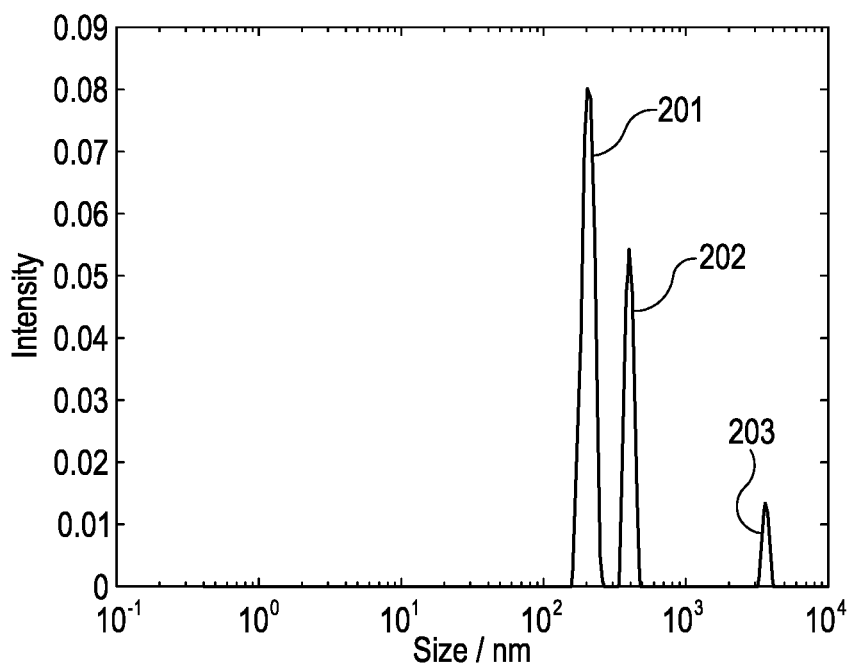
FIG. 2 is a graph illustrating a particle size distribution that includes a spurious peak resulting from contaminant scattering at a single angle.

In an example, a mixture of polystyrene latex spheres of diameter 200 nm and 400 nm was prepared in an aqueous dispersion. Two methods were used to fit a particle size distribution to the same instrument data. The first method did not assume any single-angle noise. FIG. 2 shows the resulting particle size distribution, which comprises a peak 201 at 200 nm, a peak 202 at 400 nm and a peak 203, corresponding with a contaminant, at 3.5 microns. The fit residual has a magnitude of 4.6e-4 (L2-norm).

Figure 3:
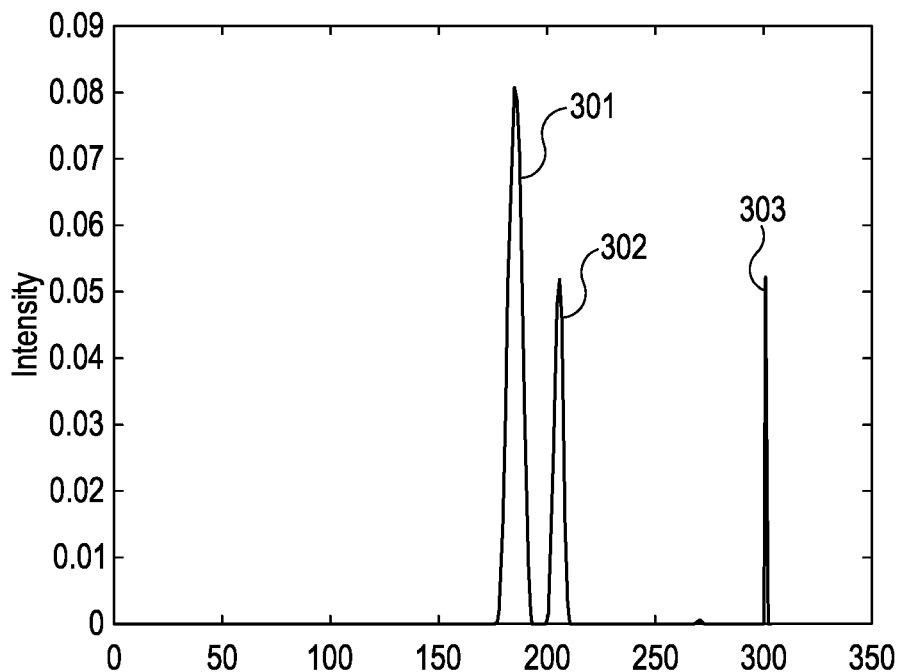
FIG. 3 is a graph illustrating a particle size distribution determined according to an embodiment of the second aspect, showing the single angle noise contribution in an appended noise bin.
Figure 4:
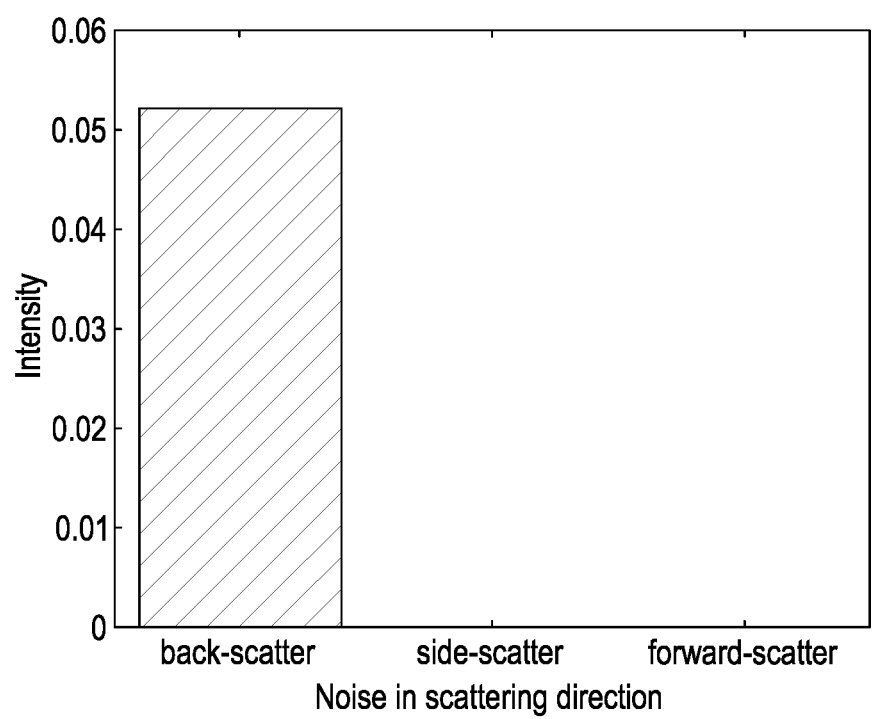
FIG. 4 illustrates the relative amount of noise contribution at each of the three scattering angles used in both FIG. 2 and FIG. 3.

FIG. 3 shows the vector x calculated in accordance with an embodiment, in which a single-angle noise contribution is assumed to be present to a greater or lesser degree at each scattering angle. The result is a particle size distribution that includes a peak 301 at bins corresponding with 200 nm, a peak 302 at bins corresponding with 400 nm, negligible contaminant at 3.5 microns and significant single-noise contribution 303 in the noise bins that are at the end of the vector x. In this case the noise contribution was present in back-scatter but not in either of side-scatter or forward scatter, as illustrated in FIG. 4, which shows the intensity assigned to contaminants at each of the three scattering angles of this measurement. The fit residual has a magnitude of 3.8e-4 ($L^2$-norm)—smaller than achieved without consideration of a single-angle noise contribution.

Although the foregoing example has illustrated the application of this technique to three scattering angles, it will be understood that fewer or more scattering angles may be used in accordance with alternative embodiments.

In some embodiments, the same principles can be applied to measurements that are not taken at different scattering angles (but are taken at different times, with at least some, or all, at the same scattering angle), so that a particle size distribution can be determined from the ensemble data that discounts scattering contributions from contaminants. This approach will be effective in removing scattering contributions from contaminants that are not present in every measurement, and which are well approximated by the model used to simulate the scattering contribution from the contaminants.

Size Dependent Regularization

Because the MADLS problem (and more generally, the DLS problem) is ill-conditioned, regularisation may be used to bias the solution against fitting to noise and to enforce some predefined property of the result. The system of linear equations g=Kx becomes (with only the relevant matrix components shown):

$$\begin{bmatrix} g \\ 0 \end{bmatrix} = \begin{bmatrix} K \\ \gamma\Gamma \end{bmatrix} x \quad (5)$$

In the above, g may represent a matrix of n correlation functions $$\left( i.e. \begin{bmatrix} g(\theta_1) \\ \dots \\ g(\theta_n) \end{bmatrix} \right),$$

each corresponding with a measurement taken at a different time and/or at a different scattering angle, and K may represent a matrix $$\begin{bmatrix} K(\theta_1) \\ \dots \\ K(\theta_n) \end{bmatrix}.$$

Typically, the regularisation coefficient, γ, takes the form of a scalar value to enforce more or less regularisation, dependant on the magnitude of γ, with larger γ resulting in more regularisation. The regularisation matrix, Γ, can take several forms. When performing DLS, it is often desired to enforce smoothness in the result as particle size distributions are believed to be mostly continuous. Alternatively, the solution norm may be biased toward zero if the particle size distribution is believed to be monomodal.

The regularisation term, γΓ, forms part of the residual to be minimised:

$$\|Kx-g\|^2 + \|\gamma\Gamma x\|^2 \quad (6)$$

In this example embodiment, the matrix Γ may act as a low pass operator to penalise curvature in the solution, x. When measuring the particle size distribution across a large dynamic range of size bins, it is not always possible to realise a regularisation coefficient that suitably penalises curvature at small particle size and large particle size simultaneously. This is not only in part due to the relative separation of neighbouring size bins (since these are typically log-spaced) but also the differing particle characteristics at small and large particle size.

According to embodiments, this problem may be solved by using a vector of regularisation coefficients γ, such that the regularisation coefficient is dependent on the particle size.

$$\begin{bmatrix} g \\ 0 \end{bmatrix} = \begin{bmatrix} K \\ \gamma\Gamma \end{bmatrix} x \quad (7)$$

This allows more regularisation to be enforced at large sizes where particle size classes are more widely spaced and we wish to prevent a spiky solution. Conversely, this allows less regularisation at small size where we wish to employ more resolving capability. In this way, the highest possible resolution may be maintained across a large size range—0.3 nm to 10 um.

In order to illustrate this, an example DLS measurement will be simulated. The simulated example comprises four separate particle components:

| Peak ID | Diameter/nm | Pdi | Intensity contribution (arb.) |
| --- | --- | --- | --- |
| 1 | 3.8 | 0.01 | 1 |
| 2 | 8.5 | 0.01 | 1 |
| 3 | 500 | 0.02 | 0.5 |
| 4 | 1000 | 0.02 | 0.5 |

Figure 5:
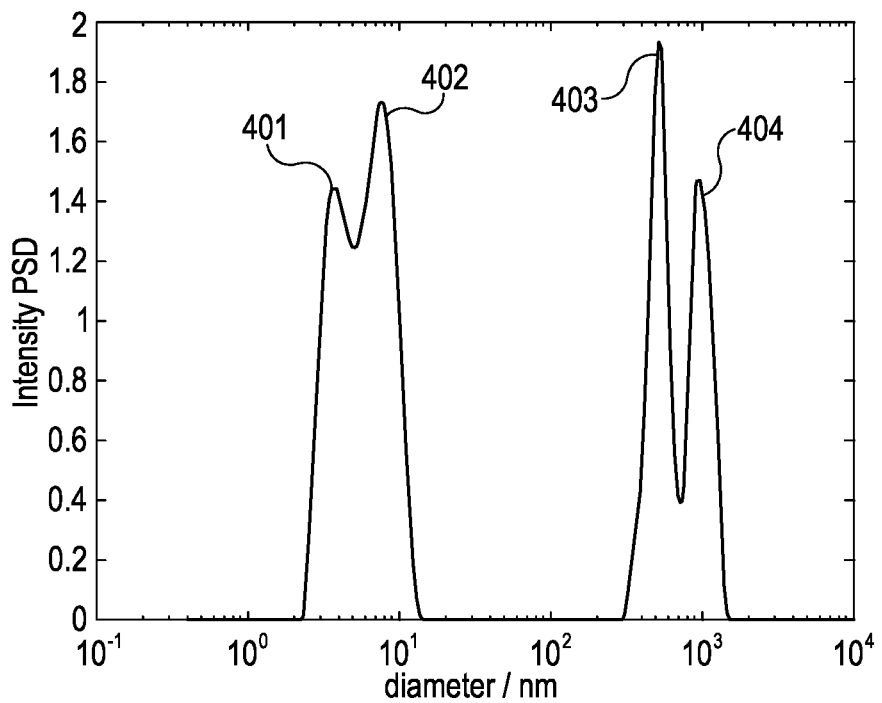
FIG. 5 is a particle size distribution determined according to an embodiment of the third aspect, in which similar particle sizes that are both small and large are correctly resolved by using vector regularisation.

This represents a two-component mixture of protein monomers in the presence of a small number of large particulates (the large particulates are similar by scattering intensity, because this scales with the sixth power of particle diameter). A white noise contribution of 0.1% was added to the simulated auto-correlation functions. Shown in FIG. 5 is the resultant particle size distribution, derived using the MADLS method with a vector of regularisation coefficients. All peaks are resolvable, with peaks 401 to 404 respectively corresponding with peak ID 1 to 4 in the above table.

The vector of regularisation coefficients, γ, employed in the above analysis varied with particle size in a way that is linear in log space, according to the function:

$$\gamma_x = m\cdot\log(x)+c \quad (8)$$

Figure 6:
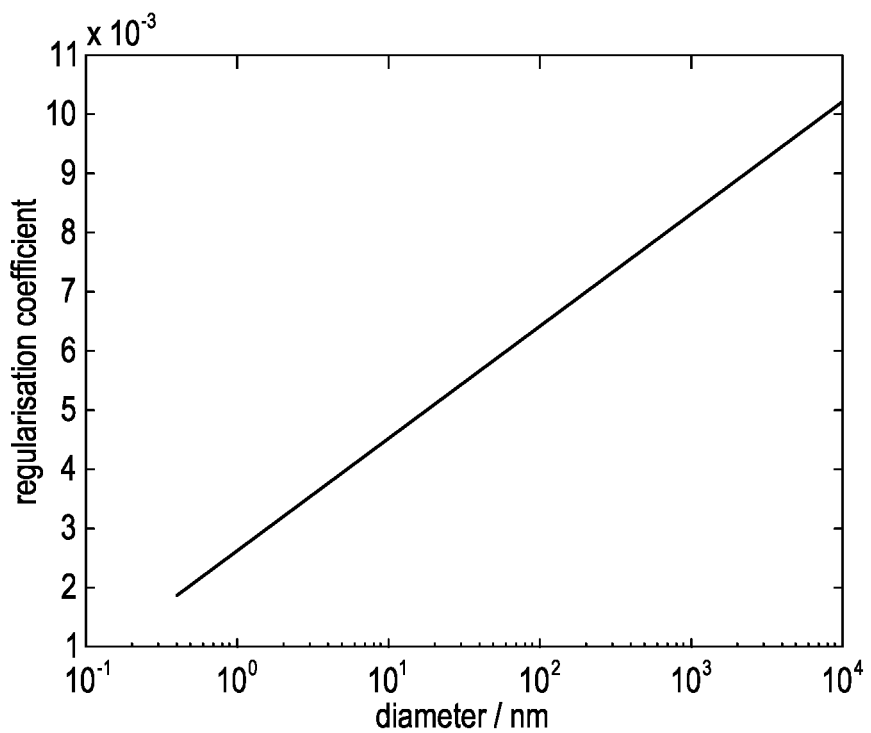
FIG. 6 is a graph showing the regularisation vector that was used to determine FIG. 5, showing regularisation coefficient as a function of particle size.

In this example, m=0.019 and c=0.0026 (with x measured in nm), with the result that the regularisation coefficient varied as shown in FIG. 6. Other functions of particle sized may be used to determine the regularisation vector (e.g. a non-log function, a polynomial etc).

Figure 7:
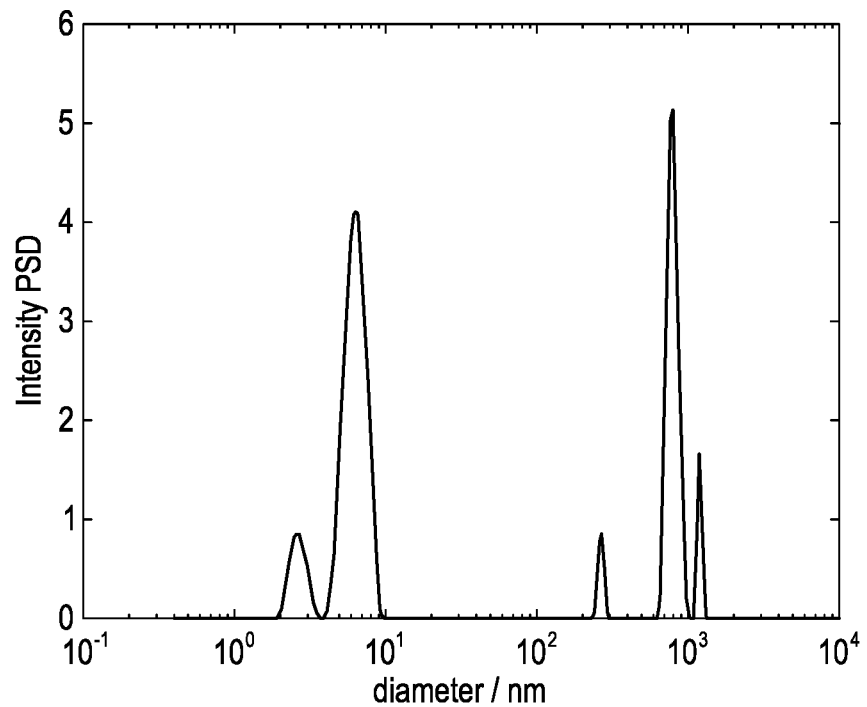
FIG. 7 is a graph showing a particle size distribution determined not in accordance with the third aspect, in which a relatively low scalar regularisation coefficient is used, illustrating a "spiky" distribution for larger particle sizes.

The results in FIG. 5 can be contrasted with results obtained with a scalar regularisation coefficient (γ=0.002), which are shown in FIG. 7. In FIG. 7 the large particle contribution is over-resolved because of noise on the simulated measurement.

Figure 8:
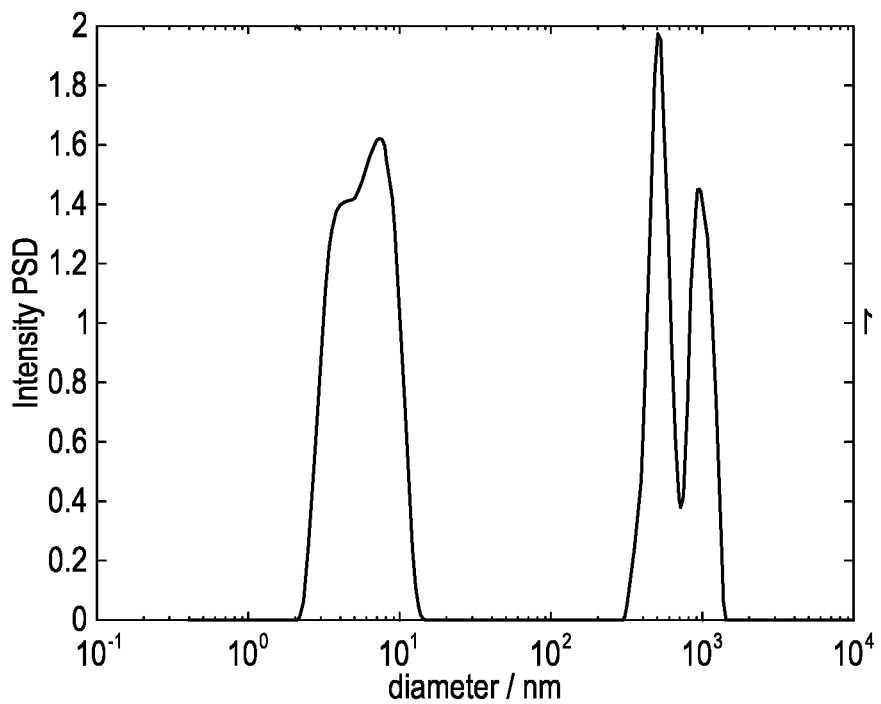
FIG. 8 is a graph showing a particle size distribution determined not in accordance with the third aspect, in which a relatively high scalar regularisation coefficient is used, illustrating an over regularised distribution for smaller particle sizes.

Increasing the scalar regularisation coefficient (γ=0.0065), does not remedy this problem, because this causes the small particle contribution to be poorly resolved, as shown in FIG. 8. The applicant has found that using a vector regularisation that varies with particle size to provide improved measurement accuracy in the particle size distribution.

It is possible to determine an appropriate regularisation coefficient (e.g. automatically). One method described in the literature is the L-curve method (C. Hansen, D. P. O'Leary, *The use of the L-Curve in the Regularization of Discrete Ill-Posed Problems*, SIAM J. Sci. Comput., 1993, 14(6), 1487-1503). According to this method, the optimal regularisation coefficient is that which minimises both the residual norm (∥Kx−g∥) and the regularisation norm (∥Γx∥). Plotting the residual norm against the regularisation norm across a range of regularisation coefficient typically results in an L-shaped curve, the corner of which represents the optimum regularisation coefficient.

This approach can be adapted to determine an optimum regularisation vector, γ. In the example above, in which a linear log function is used to determine the regularisation vector, the intercept, c, and the gradient m, can be iterated, and multiple residual norm vs regularisation norm (L-curves) can be plotted. Following this, an appropriate regularisation intercept and gradient pair can be deduced. In principle, a similar analysis can be applied to compare any functions for determining an appropriate regularisation vector. Such an analysis can be applied automatically by a processor/instrument, based on measurement data (simulated or actual) that is representative of a particular use-case for an instrument. Alternatively, a regularisation vector (or vectors) can be determined that is generally appropriate for a particular customer requirement. In some embodiments, the user may be able to select between alternative regularisation approaches (e.g. scalar, first vector (low gradient), second vector (high gradient), etc).

Figure 9:
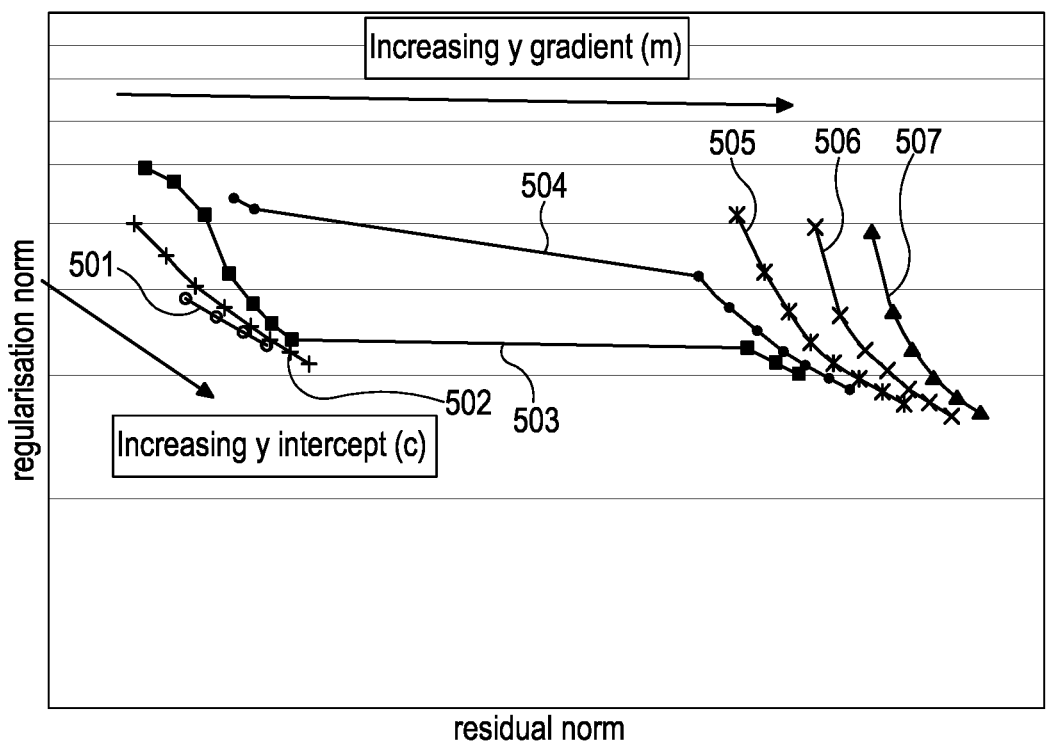
FIG. 9 is a graph showing a set of L-curves, for use in selecting an optimal function for determining a regularisation vector.

FIG. 9 shows a set of L-curves 501-507 respectively corresponding with values of gradient, m, in equation (8) of 0.003 to 0.009 (in increments of 0.001), with each curve 501-507 having a series of values for intercept, c, incremented between 0.001 and 0.01. Low gradient with moderate intercept are shown by FIG. 9 to be optimal (e.g. similar to the parameters used for FIG. 5).

Instrument

Figure 10:
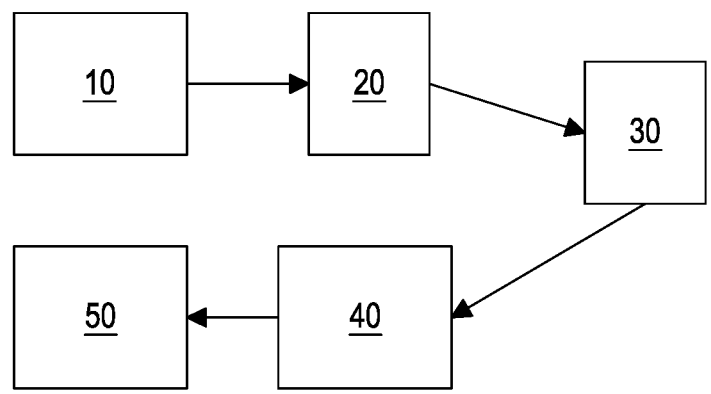
FIG. 10 is a block diagram of an instrument according to an embodiment.

FIG. 10 illustrates an instrument according to an example embodiment, comprising a light source 10, sample holder 20, detector 30, processor 40 and optional display 50.

The light source 10 may be a laser (or an LED) and illuminates a sample on or in the sample holder 20 with a light beam. The sample comprises a fluid in which particles are suspended, and the light beam is scattered by the particles to create scattered light. The scattered light is detected by the detector 30, which may comprise a photon counting detector such as an APD. Suitable collection optics may be provided to collect light scattered at a particular scattering angle (such as a non-invasive backscatter, or NIBS, arrangement that is employed in the Zetasizer Nano from Malvern Panalytical Ltd). The collection optics may be configured to allow a single detector to receive light scattered at different angles (e.g. using optical fibres and an optical switch).

The detector 30 provides measurement data (e.g. a sequence of photon arrival times) to the processor 40, which may be configured to determine a scattering intensity over time. The processor determines a correlation function from the measurement data, for use in determining particle size in accordance with dynamic light scattering principles. Specifically, the processor 40 is configured to perform at least one of the methods described herein.

The processor 40 is optionally configured to output a particle size distribution to a display 50, which displays the result to a user. The processor 40 may comprise a system on chip/module, a general purpose personal computer, or a server. The processor 40 may be co-located with the detector 30, but this may not always be the case. In some embodiments the processor 40 may be part of a server, to which measurement results are communicated (e.g. by a further computing device).

Although a number of examples have been described, these are not intended to limit the scope of the invention, which is to be determined with reference to the accompanying claims.

The invention claimed is:

1. A method of determining particle size distribution from multi-angle dynamic light scattering data, comprising:
   a light source configured to illuminate a sample on or in a sample holder, wherein the sample comprises a fluid with suspended particles;
   a detector configured to detect light scattered by the particles in the sample; and
   a processor, wherein the processor is configured to:
   determine a series of measured correlation functions $g(\theta_i)$ at scattering angles $\theta_i$ from the scattered light detected by the detector;
   solve an equation comprising:

$$\begin{bmatrix} g(\theta_1) \\ \ldots \\ g(\theta_n) \end{bmatrix} = \begin{bmatrix} \alpha_1 K(\theta_1) \\ \ldots \\ \alpha_n K(\theta_n) \end{bmatrix} x$$

wherein: KW is the instrument scattering matrix computed for angle i, x is the particle size distribution, and $\alpha_1$ is the scaling coefficient for angle i;
   a) provide initial estimates for scaling factors $a_2$ to $a_n$, and defining $a_1=1$;
   b) iterate scaling factors $a_2$ to $a_n$ using a non-linear solver;
   c) solve for x using a linear solver;
   d) calculate residual;
   e) repeat steps b) to d) while the residual is greater than a predefined exit tolerance;
   determine a resulting particle size distribution when the residual is not greater than the predefined exit tolerance; and
   display the resulting particle size distribution.

2. The method of claim 1, wherein the linear solver is NNLS, and/or the non-linear solver is selected from Nelder-Mead simplex, Levenberg-Marquardt and Gauss-Newton.

3. The method of claim 1, wherein the initial estimates for the scaling factors $\alpha_2$ to $\alpha_n$ are estimated by extrapolation of a correlation function to a zero-delay time (τ=0).

4. The method of claim 1, wherein the predefined exit tolerance is:
   a convergence criterion based the preceding residual, or the predefined exit tolerance is an absolute residual threshold.

5. The method of claim 1, further comprising repeating the steps a) to e) for a different non-linear solver, to determine which non-linear solver provides the smallest residual.

6. The method of claim 1, further comprising measuring a time history of scattered light intensity at each respective scattering angle, θ, and determining the correlation functions g(θ$_i$) for each scattering angle.

7. A method of determining particle size distribution from dynamic light scattering data, comprising:
a light source configured to illuminate a sample on or in a sample holder, wherein the sample comprises a fluid with suspended particles;
a detector configured to detect light scattered by the particles in the sample and determine measurement data from the scattered light; and
a processor, wherein the processor is configured to:
determine, from the scattered light detected by the detector, measured correlation functions g(θ$_1$) to g(θ$_n$);
solve an equation of the form:

$$\begin{bmatrix} g(\theta_1) \\ \ldots \\ g(\theta_n) \end{bmatrix} = \begin{bmatrix} \alpha_1 K(\theta_1) \\ \ldots \\ \alpha_n K(\theta_n) \end{bmatrix} x$$

wherein:
g(θ$_i$) is the measured correlation function for measurement time i, corresponding with a scattering angle θ$_i$, K(θ$_i$) is the instrument scattering matrix computed for the angle θ$_i$, x is the particle size distribution and α$_i$ is the scaling coefficient for measurement time i (with a$_1$=1);
the vector x takes the form: [x$_1$, x$_N$, n$_1$, . . . , n$_n$], where x$_1$ to x$_N$ are the scattering intensities corresponding with each size bin, and the terms n$_1$ to n$_n$ are noise intensities corresponding with each of the measurement times or angles; and
columns in K are computed as the expected instrument response according to each element in x, with columns in K at indexes according to elements x$_1$ to x$_N$ calculated for each correlator lag-time,τ and angle, θ, and columns at indexes n$_1$ to n$_n$ calculated as a computed noise contribution for each correlator lag-time,τ, at each angle, θ, based on an assumption about the characteristics of the noise;
determine a resulting particle size distribution based at least on the computed expected instrument response and the computed noise contribution; and
display the resulting particle size distribution.

8. The method of claim 7, wherein the dynamic light scattering data is multi-angle data, and each measurement time corresponds with a different measurement angle θ$_i$; or
wherein the dynamic light scattering data is of single angle type, and each measurement time i corresponds with the same measurement angle θ$_i$.

9. The method of claim 7, wherein the computed noise contribution is based on the expected instrument response to a large particle in a scattering volume of the instrument; wherein the large particle is assumed to be at least 3 microns in diameter, or at least 10 microns in diameter.

10. The method of claim 9, wherein the computed noise contribution is determined according to:

g$_1$(τ)=exp($-q_i^2 D_t \tau$)

where:
g$_1$(τ) is the instrument-measured field autocorrelation functions at lag time, τ; q is the scattering wave vector $$\left(q = \frac{4\pi n_o}{\lambda} \sin\left(\frac{\theta_i}{2}\right)\right);$$

n$_O$ is the dispersant refractive index; λ is the vacuum wavelength; θ$_i$ is the scattering angle; D$_t$ is the translational diffusion coefficient $$\left(D_t = \frac{k_B T}{3\pi \eta d}\right);$$

k$_B$ is the Boltzmann constant; T is the absolute temperature; η is the dispersant viscosity; and d is the assumed large particle hydrodynamic diameter.

11. The method of claim 7, further comprising sequentially measuring a time history of scattered light intensity at each respective scattering angle, θ, and determining the correlation functions g(θ$_n$) for each scattering angle.

12. A method of determining a particle size distribution, x, from a dynamic light scattering measurement, comprising:
a light source configured to illuminate a sample on or in a sample holder, wherein the sample comprises a fluid with suspended particles;
a detector configured to detect light scattered by the particles in the sample and measure a time sequence of scattering intensity; and
a processor, wherein the processor is configured to:
determine a measured correlation function, g, derived from the time sequence of scattering intensity;
solve a system of linear equations comprising:

$$\begin{bmatrix} g \\ 0 \end{bmatrix} = \begin{bmatrix} K \\ \gamma \Gamma \end{bmatrix} x$$

by minimising the sum of residuals:

$\|Kx-g\|^2 + \|\gamma \Gamma x\|^2$ where K is an instrument scattering matrix, r is a regularisation matrix, and γ is a regularisation vector comprising regularisation coefficients for each particle size in the particle size distribution, x;
determine a resulting particle size distribution based at least on the regularisation vector; and
display the resulting particle size distribution.

13. The method of claim 12, further comprising performing a measurement to obtain the time sequence of scattering intensity.

14. The method of claim 12, wherein the system of linear equations to be solved includes regularisation, thereby comprising:

$$\begin{bmatrix} g(\theta_1) \\ \ldots \\ g(\theta_n) \\ 0 \end{bmatrix} = \begin{bmatrix} \alpha_1 K(\theta_1) \\ \ldots \\ \alpha_n K(\theta_n) \\ \gamma \Gamma \end{bmatrix} x$$

optionally wherein:
- the vector x takes the form: $[x_1, \ldots, x_N, n_1, \ldots, n_n]$, where $x_1$ to $x_N$ are the scattering intensities corresponding with each size bin, and the terms $n_1$ to $n_n$ are noise intensities corresponding with each of the measurement times or angles; and
- columns in K are computed as the expected instrument response according to each element in x, with columns in K at indexes according to elements $x_1$ to $x_N$ calculated for each correlator lag-time, $\tau$ and angle, $\theta$, and columns at indexes $n_1$ to $n_n$ calculated as a computed noise contribution, at each angle, $\theta$, based on an assumption about the characteristics of the noise.

* * * * *